US009955218B2

(12) United States Patent
Panchaksharaiah et al.

(10) Patent No.: US 9,955,218 B2
(45) Date of Patent: Apr. 24, 2018

(54) SMART MECHANISM FOR BLOCKING MEDIA RESPONSIVE TO USER ENVIRONMENT

(71) Applicant: Rovi Guides, Inc., Santa Clara, CA (US)

(72) Inventors: Vishwas Sharadanagar Panchaksharaiah, Karnataka (IN); Vikram Makam Gupta, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 14/697,920

(22) Filed: Apr. 28, 2015

(65) Prior Publication Data

US 2016/0323643 A1   Nov. 3, 2016

(51) Int. Cl.

| | |
|---|---|
| *H04N 7/16* | (2011.01) |
| *H04N 21/454* | (2011.01) |
| *H04N 21/4545* | (2011.01) |
| *H04N 21/475* | (2011.01) |
| *H04N 21/44* | (2011.01) |
| *H04N 21/441* | (2011.01) |
| *H04N 21/442* | (2011.01) |
| *H04N 21/45* | (2011.01) |
| *H04N 21/845* | (2011.01) |

(52) U.S. Cl.
CPC ....... *H04N 21/4542* (2013.01); *H04N 21/441* (2013.01); *H04N 21/44016* (2013.01); *H04N 21/44218* (2013.01); *H04N 21/4532* (2013.01); *H04N 21/45455* (2013.01); *H04N 21/4753* (2013.01); *H04N 21/8456* (2013.01)

(58) Field of Classification Search
CPC .................................................. H04N 21/4542
USPC ........................................................... 725/25
See application file for complete search history.

(56) References Cited

U.S. PATENT DOCUMENTS

| | | |
|---|---|---|
| 5,434,678 A | 7/1995 | Abecassis |
| 6,226,793 B1 | 5/2001 | Kwoh |
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward, III et al. |
| 7,165,098 B1 | 1/2007 | Boyer et al. |
| 7,761,892 B2 | 7/2010 | Ellis et al. |

(Continued)

FOREIGN PATENT DOCUMENTS

WO   WO-2013107038   7/2013

*Primary Examiner* — Michael B Pierorazio
(74) *Attorney, Agent, or Firm* — Haley Guiliano LLP

(57) ABSTRACT

Systems and methods are described herein for blocking sections of media using censoring techniques adaptive to context of the user environment. For example, by first determining features of the user environment such as location, time of day, attention level of the user, number of users, the type of media system being used, or the layout of a user environment, different methods of censorship and blocking may be implemented. A group of friends watching television with rapt attention may be shown a highlight reel; a single user not paying attention to a movie may be shown a synopsis of the plot; or a child watching a cartoon on a smart-phone may be presented with a social media update to seamlessly distract their attention. Thus unwanted content is blocked in an intelligent fashion, and overall user experience is enhanced.

20 Claims, 5 Drawing Sheets

(56) References Cited

U.S. PATENT DOCUMENTS

| | | |
|---|---|---|
| 8,046,801 B2 | 10/2011 | Ellis et al. |
| 8,523,667 B2 | 9/2013 | Clavin et al. |
| 8,588,579 B2 | 11/2013 | Casagrande et al. |
| 8,620,769 B2 | 12/2013 | Yates |
| 8,726,309 B2 | 5/2014 | Casagrande et al. |
| 8,934,758 B2 | 1/2015 | Meijer |
| 2002/0174430 A1 | 11/2002 | Ellis et al. |
| 2003/0110499 A1 | 6/2003 | Knudson et al. |
| 2005/0086069 A1* | 4/2005 | Watson ............... H04N 21/4508 726/3 |
| 2005/0251827 A1 | 11/2005 | Ellis et al. |
| 2006/0110136 A1* | 5/2006 | Abecassis ................. G11B 7/14 386/261 |
| 2007/0271580 A1* | 11/2007 | Tischer .................. H04H 60/07 725/35 |
| 2008/0141293 A1 | 6/2008 | Blanchard et al. |
| 2009/0133051 A1* | 5/2009 | Hildreth ............... H04N 5/4403 725/28 |
| 2010/0153885 A1 | 6/2010 | Yates |
| 2013/0294755 A1 | 11/2013 | Arme et al. |
| 2015/0070516 A1* | 3/2015 | Shoemake ....... H04N 21/42203 348/207.11 |

\* cited by examiner

600

602
Generate for display a media asset.

604
Determine, based on a characteristic associated with a user, that a segment of the media asset is to be prevented from being generated for display to the user

606
Determine a context in which the user is viewing the media asset

608
Identify replacement content for the segment based on the context

610
Replace the segment with the identified replacement content

SMART MECHANISM FOR BLOCKING MEDIA RESPONSIVE TO USER ENVIRONMENT

BACKGROUND

Media, such as television programs, films, video games, and audio, may have content warnings for violence, nudity, strong language, or other types of potentially offensive and inappropriate content. Traditional media systems are able to recognize media content ratings, and block portions of the media based on the content ratings in conjunction with pre-set parental controls. This is commonly done by blurring out, replacing, or otherwise obfuscating the media. However, traditional media systems will always block out the same portions of content in the same obvious manner for every user.

SUMMARY

Systems and methods are described herein for adapting the content controls and blocking methods based on a user environment, alleviating the need for users to actively monitor and change their content controls and resulting in an enhanced user experience. For example, control circuitry may determine a context in which a user is consuming media. This may include features of the user environment such as location, time of day, attention level of the user, number of users, the type of media system being used, or the layout of the user environment. Based on the context, control circuitry may identify specific types of replacement content to block out unwanted segments of media. For example, a group of friends watching a television show with rapt attention may be shown a highlight reel; a single user not paying attention to a movie may be shown a synopsis of the plot thus far; or a child watching a cartoon on a smart-phone may be presented with a social media update to seamlessly distract their attention. Thus the control circuitry both intelligently blocks unwanted content and enhances the user experience in the process.

In some aspects control circuitry may generate for display a media asset. For example, control circuitry may be configured to generate for display a film or television show on a home entertainment center. The control circuitry may also be configured to generate for display media assets on a smart-phone, tablet computer, or other type of user device.

The control circuitry may then determine, based on a characteristic associated with a user, that a segment of the media asset is to be prevented from being generated for display to the user. Possible characteristics include the age or name of the user. User characteristics may also include demographic information beyond the age of a user, such as a gender, ethnicity, or a record of past user behavior and content preferences. For example, the control circuitry may access a user profile associated with the user, and determine that the user is a young child, from information contained on the child's user profile. The control circuitry may also be able to analyze content warnings associated with different segments of media and determine if particular segments of media should be prevented from being generated for display to the user. For example, the control circuitry may determine that an especially violent scene from a movie with a "Graphic Violence" warning should not be presented to child.

The control circuitry may then determine a context in which the user is viewing the media asset. The control circuitry may determine a context based on a geographic location, a date and time, a type of a device on which the media asset is generated for display, an arrangement of objects within a space, a user profile associated with the user, the user profile of a second user in the same room, the proximity of a second user to the user, and the like. For example, the control circuitry may determine that the user is watching a movie at school, on a smart-phone, with a friend, in the afternoon.

The control circuitry may then identify replacement content for the segment based on the context. Examples of possible replacement content may include an application, a broadcast channel, a simulated phone call, a simulated news broadcast, a social media update, a website, and some other media that is normally accessible by the device the control circuitry is using to display the media asset on. For example, in the above situation, the control circuitry may identify a social media update that would be of interest to both the child and the child's friend. The control circuitry may then replace the segment with the identified replacement content. Continuing the above example, the control circuitry may generate for display the social media update, covering the screen of the smart-phone and blocking the child from seeing the violent content.

In some embodiments, the control circuitry may replace the segment by determining (1) a start time corresponding to a time when the segment is to be presented to the user, and (2) a duration of the segment. The control circuitry may then generate for display the replacement content at the start time, and present the replacement content to the user for the same duration as the segment being blocked. For example, the control circuitry may determine that a movie features a 20-second gunfight that starts 10 minutes into a film. At the 10-minute mark, the control circuitry will generate for display a social media update that covers the screen, and continue to display the social media update for 20 seconds. The control circuitry may then resume the media asset after the replacement content has ended.

In some embodiments the control circuitry may also identify a user environment surrounding the user as part of the context. For example, the control circuitry may identify the environment surrounding the user as the user's home, or the home of a friend. The control circuitry may then identify replacement content based on the user environment. For example, if the control circuitry determines that the user is a child at a friend's home, the replacement content may be a collection of social media communications (e.g., "tweets" a form of social media communication where a user may transmit a string of 140 characters to be viewed publicly), but if the control circuitry determines that the child is at home watching a movie next to the child's mother, the replacement content may be a summary from the nightly news.

In some embodiments, the control circuitry may determine characteristics such as height, facial features, body proportions, or voice by using cameras and microphones. The control circuitry may image a body of a user using a camera. The control circuitry may then identify facial features or body proportions from the imaged body and determine the characteristic associated with the user based on the identified facial features or body proportions. For example, the control circuitry may use facial recognition techniques to identify the user and access a user profile containing the age of the user. Even if an unambiguous identification is impossible, the control circuitry may estimate the age of a user through their body proportions. The control circuitry may then determine that a segment should be blocked based on either the known or estimated characteristics.

In some embodiments, the control circuitry may access a user profile and determine, based on a profile associated with the user, a set of content categories that are to be prevented from being generated for display to the user. For example, the control circuitry may check the profile of a user and determine that the user is a seventeen-year-old girl who prefers to avoid coarse language. The control circuitry may then determine that "TV-MA" or "Rated-R" content should not be presented due to the age of the user, and the control circuitry may also determine that "Coarse Language" or "Explicit Language" content should not be presented based on the user preferences contained in the user profile. In some embodiments the control circuitry may then monitor metadata associated with the media asset. For example, the control circuitry may receive metadata transmitted over a network connection or metadata included in vertical blanking interval (VBI) data transmitted along with the media asset. The metadata may include a list of categories associated with the segment of media currently being received by the control circuitry, and the control circuitry may monitor the received metadata to determine content categories associated with the segment of media currently being received.

For example, as a user changes channels between several different broadcast stations, for each new channel the control circuitry may receive metadata associated with the channel and determine a set of content categories associated with the segment of media currently played on the channel. The control circuitry may then compare the content categories associated with each segment to a set of content categories that should be prevented from being displayed to determine if the segment should be blocked. For example, the control circuitry may determine that "Rated-R," "TV-MA," "Coarse Language" and "Explicit Language" are categories that should not be generated for display based on a user profile. As a user changes between multiple channels, the control circuitry may monitor the metadata being received, and block any channel currently showing content associated with the "Rated-R," "TV-MA," "Coarse Language" or "Explicit Language" categories from being displayed.

In some embodiments the control circuitry may allow the user to override the blocking. While presenting the replacement content in place of the segment, the control circuitry may receive a user selection of an override option during the presentation of the replacement content. For example, a parent watching along with their child may decide that it is permissible for the child to watch violent content as long as the parent and child are together. Before unblocking the media, the control circuitry may prompt the user for a user credential. For example, the control circuitry may ask for a parental control password or pin number. After determining that the credential is valid, the control circuitry will suspend the presentation of the replacement content, and resume presentation of the media.

In some embodiments the control circuitry may determine a level of attentiveness of the user. If the control circuitry determines that the level of attentiveness exceeds a threshold level, the control circuitry may identify replacement content comprising an advertisement and replace the segment of media with the advertisement. If the level of attentiveness does not exceed the threshold, the control circuitry will identify replacement content comprising non-advertising media, and replace the segment of media with the non-advertising media. For example, if the control circuitry determines that a user is focused on a movie, the control circuitry may include a paid advertisement along with the replacement content, but a user who is disengaged from the movie may be presented with a summary of the plot thus far.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is a flowchart of illustrative steps involved in blocking sections of a media asset, in accordance with some embodiments of the disclosure.

DETAILED DESCRIPTION

Figure 1:
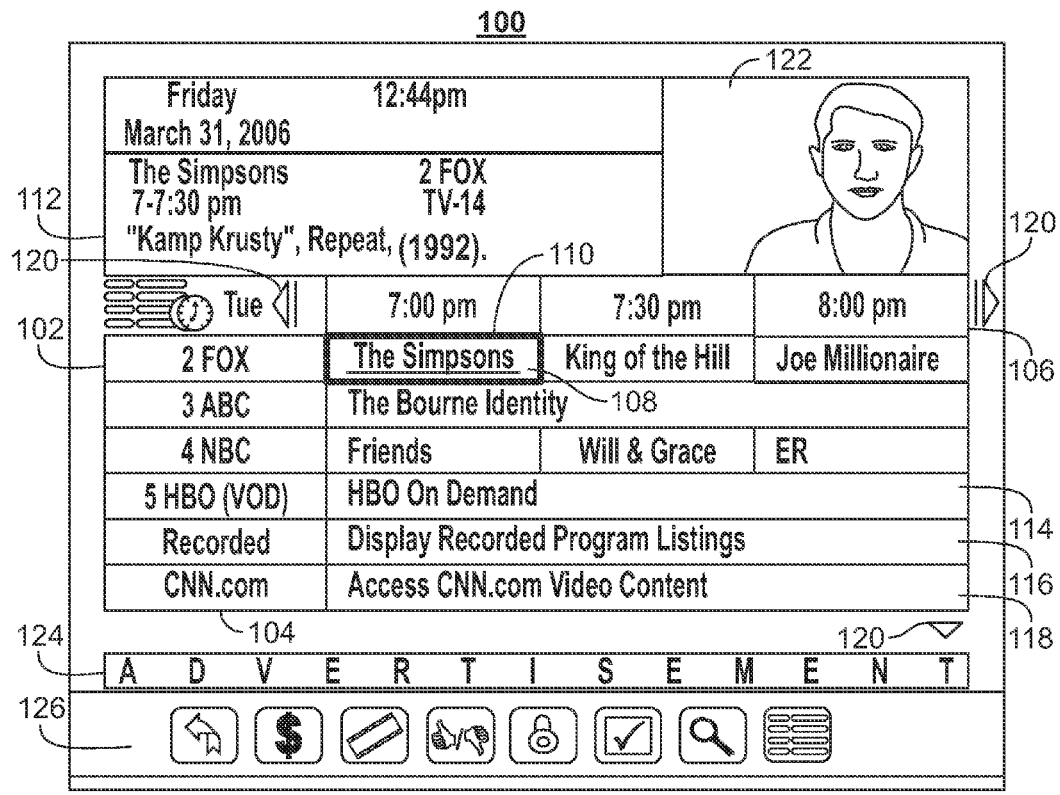
FIG. 1 shows an illustrative embodiment of a display screen that may be used to provide media guidance application listings and other media guidance information, in accordance with some embodiments of the disclosure.

Systems and methods are described herein for adapting the content controls and blocking methods based on a user environment, alleviating the need for users to actively monitor and change their content controls and resulting in an enhanced user experience. For example, control circuitry may determine a context in which a user is consuming media. This may include features of the user environment such as location, time of day, attention level of the user, number of users, the type of media system being used, or the layout of the user environment. Based on the context, control circuitry may identify specific types of replacement content to block out unwanted segments of media. For example, a group of friends watching a television show with rapt attention may be shown a highlight reel; a single user not paying attention to a movie may be shown a synopsis of the plot thus far; or a child watching a cartoon on a smart-phone may be presented with a social media update to seamlessly distract their attention. Thus the control circuitry both intelligently blocks unwanted content and enhances the user experience in the process.

In some aspects control circuitry may generate for display a media asset. For example, control circuitry may be configured to generate for display a film or television show on a home entertainment center. The control circuitry may also be configured to generate for display media assets on a smart-phone, tablet computer, or other type of user device.

The control circuitry may then determine, based on a characteristic associated with a user, that a segment of the media asset is to be prevented from being generated for display to the user. Possible characteristics include the age or name of the user. User characteristics may also include demographic information beyond the age of a user, such as a gender, ethnicity, or a record of past user behavior and content preferences. For example, the control circuitry may access a user profile associated with the user, and determine that the user is a young child, from information contained on the child's user profile. The control circuitry may also be able to analyze content warnings associated with different segments of media and determine if particular segments of media should be prevented from being generated for display to the user. For example, the control circuitry may determine that an especially violent scene from a movie with a "Graphic Violence" warning should not be presented to child.

The control circuitry may then determine a context in which the user is viewing the media asset. The control circuitry may determine a context based on a geographic location, a date and time, a type of a device on which the media asset is generated for display, an arrangement of objects within a space, a user profile associated with the user, the user profile of a second user in the same room, the proximity of a second user to the user, and the like. For example, the control circuitry may determine that the user is watching a movie at school, on a smart-phone, with a friend, in the afternoon.

The control circuitry may then identify replacement content for the segment based on the context. Examples of possible replacement content may include an application, a broadcast channel, a simulated phone call, a simulated news broadcast, a social media update, a website, and some other media that is normally accessible by the device the control circuitry is using to display the media asset on. For example, in the above situation, the control circuitry may identify a social media update that would be of interest to both the child and the child's friend. The control circuitry may then replace the segment with the identified replacement content. Continuing the above example, the control circuitry may generate for display the social media update, covering the screen of the smart-phone and blocking the child from seeing the violent content.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
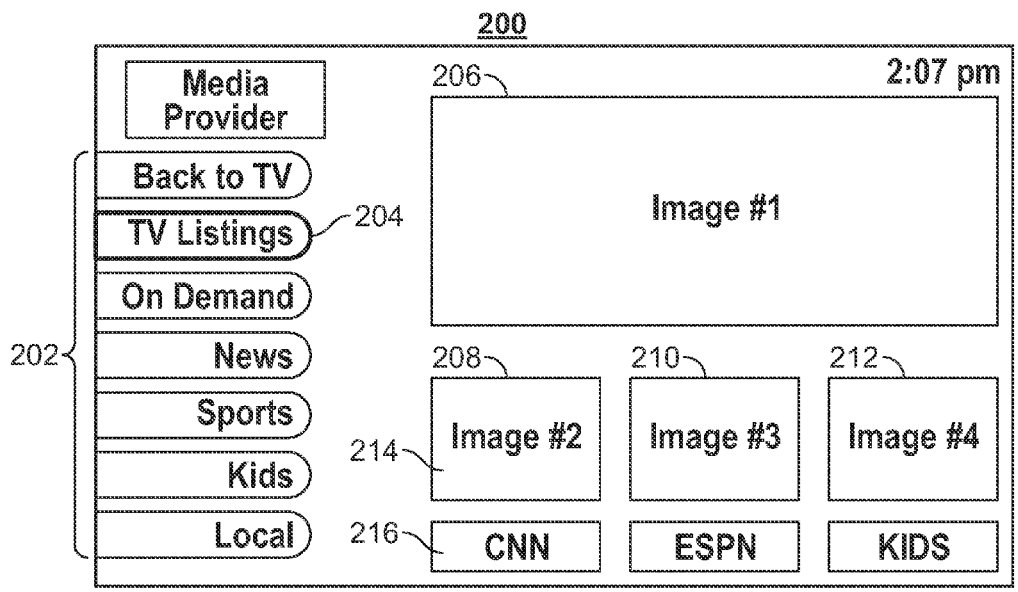
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
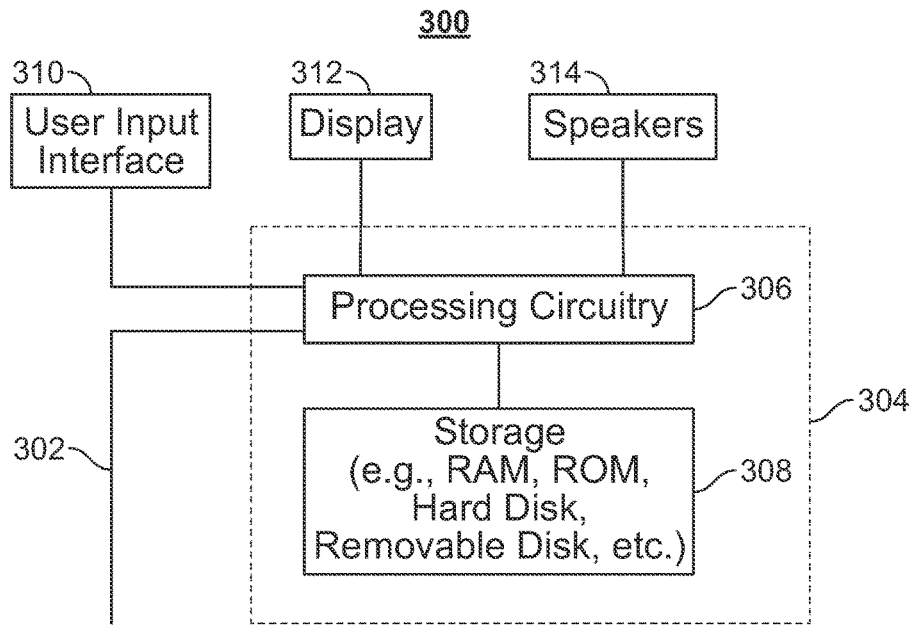
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
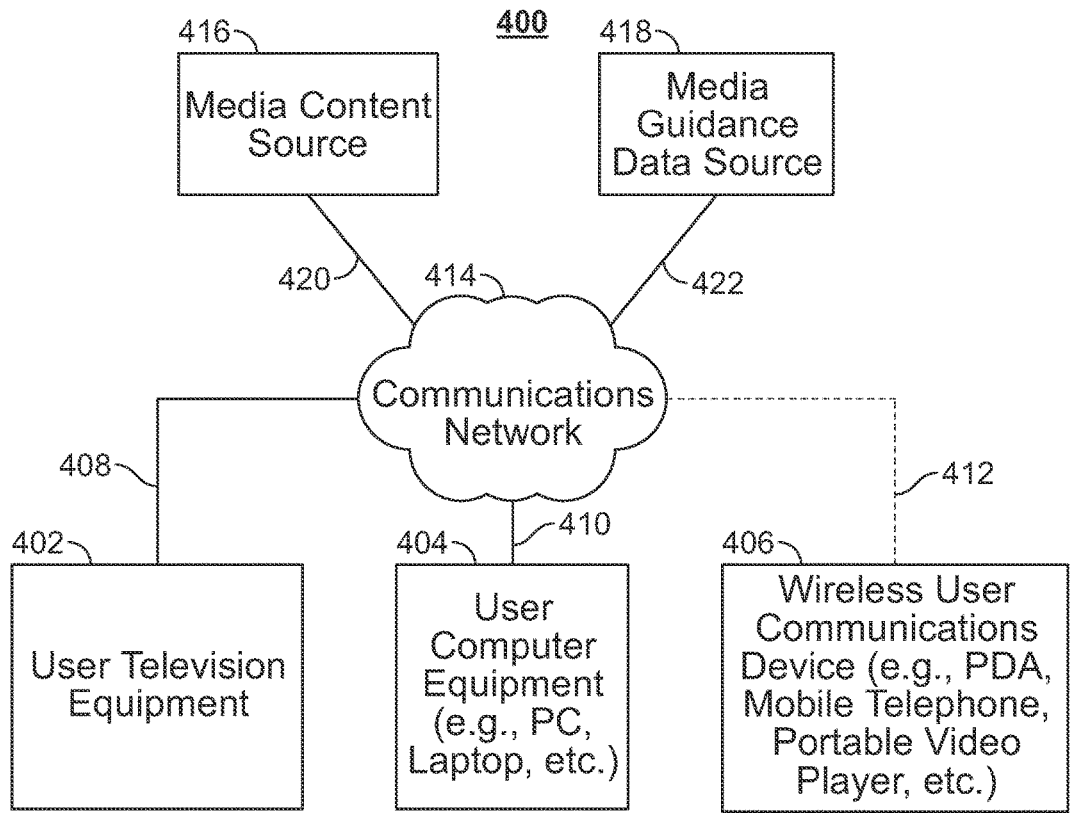
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

The term "characteristic" wherever used in this disclosure is defined to mean information ascertained by control circuitry about a user. Examples of characteristics may include information contained in a user profile associated with the user, such as the user's age, name, online pseudonyms, or demographic information such as a user's gender, ethnicity, household size, and the like. Other characteristics may include a user's height, facial features, body proportions, and voice as determined by control circuitry (e.g., via cameras and microphones). Characteristics may also include content preferences, a history of a user's past behavior, variable quantities like a user's attention level and location, and the like.

The term "context" wherever used in this disclosure is defined to mean any information associated with the setting in which a user is viewing a media asset as determined by control circuitry. Examples of context include the type of device being used to view a media asset, or a geographic location taken from GPS located with a user device, or the date and time available through an external network or device clock circuitry. Other types of context such as an arrangement of objects within a space, the number of users watching a media asset, or the physical proximity of multiple users to one another are types of context that may be obtained (e.g., through cameras and microphones).

The term "segment" wherever used in this disclosure is defined to mean any portion of a media asset. Segments may have a start time and an end time and/or duration, measured either in absolute terms or in relation to the beginning of the media asset of which the segment is a part. Segments may be overlapping, may be of any duration, and may be associated with any number of content categories. Segments may be defined by content providers, content makers, editors, users, and the like. The start time, end time, duration, and content categories associated with segments may also determined via control circuitry. For example, one segment may be the opening scene of a movie lasting between 00:00:00 and 00:15:34. The same movie may contain several user defined segments. For example, users may define a segment of a movie between 00:03:12 and 00:03:18 associated with the "Violence" category, which may overlap with another segment between 00:03:15 and 00:03:45 that contains "Nudity." A segment may also be a single type of media contained within multimedia. For example, other examples of segments may include portions of dialogue taken from a film, or individual words and sounds effects taken from an audio track.

The term "replacement content" wherever used in this disclosure is defined to mean media, applications, audio content, video content, multimedia content, and the like intended to replace or obscure media contained in a segment. Examples of replacement content include broadcast channels, simulated phone calls, smart-phone or smart-TV applications, social media updates, websites, digitally blurred copies of the segment, censor bars, and the like.

The term "user environment" wherever used in this disclosure is defined to mean the physical space surrounding a user, or features of the physical space surrounding a user. Examples of a user environment include a user's home, a store, a dimly lit room, or a noisy subway platform.

The term "content category" wherever used in this disclosure is defined to mean descriptive term, content rating, or phrase associated with a segment of media. Examples of content categories may include "violence," "strong language," "sexual content," "action," "comedy," "sports," "TV-MA," or "PG-13."

The term "credential" wherever used in this disclosure is defined to mean any data or information used to verify a user's identity or a user characteristic. Examples of credentials may include a password, personal identification number (PIN), fingerprint, biometric information, voice-print or a person's likeness.

In some embodiments, control circuitry 304 may receive a user selection of a media asset to be generated for display. Control circuitry 304 may automatically generate for display the media asset on user equipment devices 402, 404, or 406.

The control circuitry 304 may receive information about the media asset, including metadata describing the content contained in the media asset or segments of the media asset, from media content source 416 or media guidance data source 418.

Figure 5:
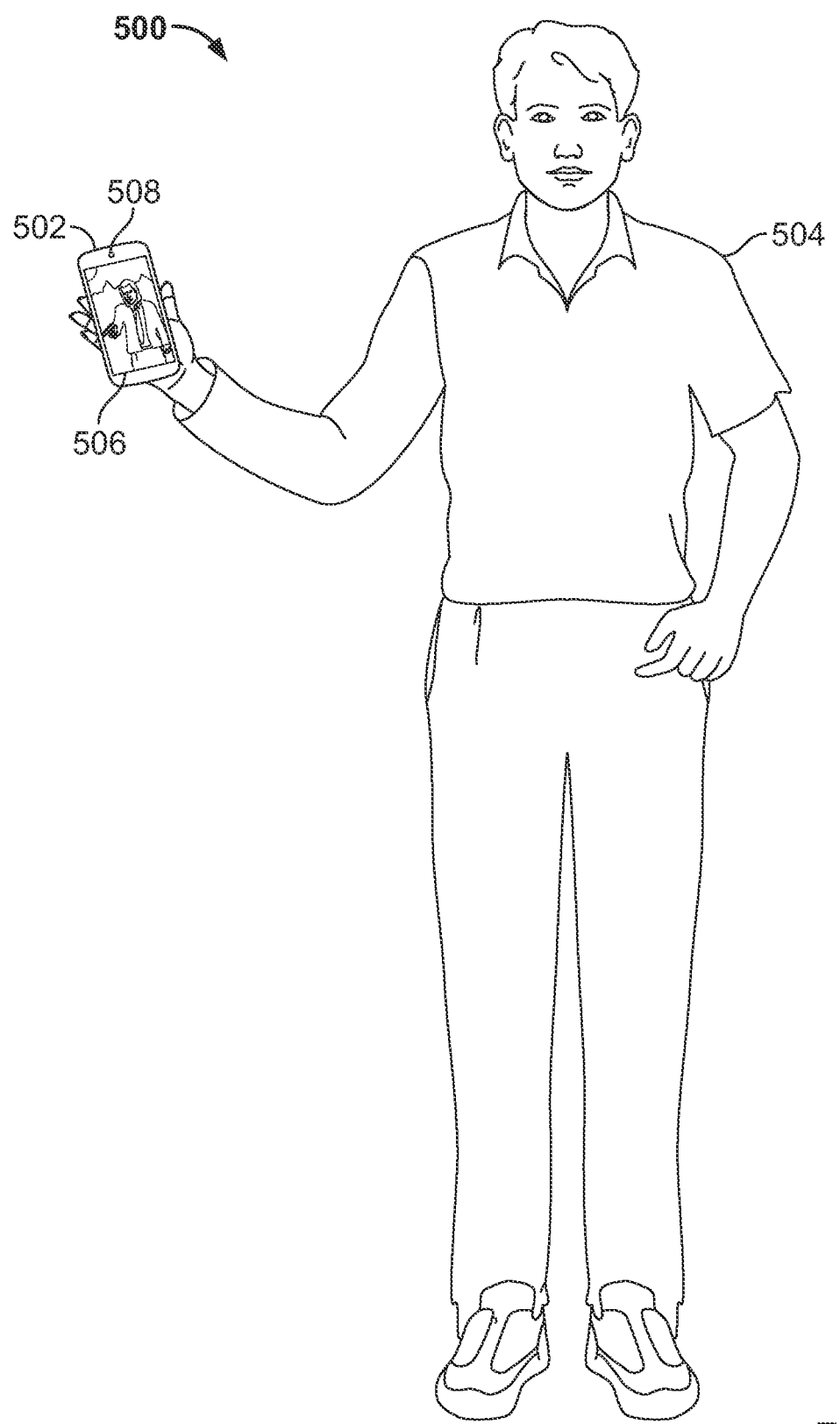
FIG. 5 shows an illustrative embodiment of a user equipment device on which a selected media asset is displayed, in accordance with some embodiments of the disclosure

FIG. 5. shows an illustrative embodiment of a user equipment device on which a selected media asset is displayed, in accordance with some embodiments of the disclosure. FIG. 5 shows a user equipment device 502 along with the user 504. User equipment device 502 may have all the capabilities of user equipment devices 402, 404, and 406, and is capable of displaying (e.g., via display 312 (FIG. 3)) a media asset 506 to user 504. User device 502 may also be capable of audio output (e.g., via speakers 314 (FIG. 3)), and may be equipped with camera 508 or other types of sensors, including GPS, microphones, accelerometers, and the like. In some embodiments control circuitry 304 may generate for display media asset 506 on user equipment device 502 (e.g., via display 312 (FIG. 3). Control circuitry 304 may receive media asset 506 from a broadcast station, device readable medium, OTT provider, or any other media content source (e.g., media content source 416 by way of communications network 414), and control circuitry 304 may generate for display media asset 506 in response to user input (e.g., by way of user interaction through user input interface 310).

In some embodiments, control circuitry 304 may receive metadata associated with media asset 506 along with, ahead of, or separately from media asset 506. For example, control circuitry 304 may obtain this metadata from media content source 416 (FIG. 4) or media guidance data source 418 (FIG. 4) via communications network 414 (FIG. 4). Metadata may also be transmitted as vertical blanking interval data by broadcasters and media content source providers (e.g., media content source 416 (FIG. 4)). This metadata may indicate content categories associated with different segments of media asset 506. For example, control circuitry 304 may receive metadata from media content source 416 indicating that the segment of media asset 506 between 00:30:14 and 00:30:43 contains adult content, or that the segment between 00:22:11 and 00:22:53 contains a violent scene. These segments may be labeled with several different descriptors and content categories, such as "Adult," "Crime," "Physical Violence," or "Emotional Distress."

In some embodiments, control circuitry 304 may determine content categories associated with a segment. For example, control circuitry 304 may determine content categories by cross-referencing a look-up table or database (e.g., media guidance data source 418 via communications network 414) listing segments of media assets with associated tags or descriptions. For example, control circuitry 304 may identify media asset 506 from metadata received from media guidance data source 418 or media content source 416. Control circuitry 304 may then cross-reference a database (e.g., media content source 416 or media guidance data source 418 via communications network 414) for segments associated with the identified media asset. Each segment in the database may be listed along with the start time of the segment, the end time of the segment, and content categories associated with the segment. Control circuitry 304 may then compare the start time and end time of the identified segments with the relative playback position of media asset 506 to identify identified segments that are either currently playing, or will be played, along with the content categories associated with them. For example, control circuitry 304 may determine that media asset 506 is the movie "Pulp Fiction," and that the current playback location is 00:34:52. Control circuitry 304 may cross-reference a database (e.g., media content source 416 or media guidance data source 418 via communications network 414) to identify currently playing segments with a start time prior to 00:34:52 and an end time later than 00:34:52, as well as future segments with a start time after 00:34:52. Control circuitry 304 may then identify the content categories associated with each of the identified segments from the listings within the database.

In some embodiments, control circuitry 304 may determine content categories associated with a segment by analyzing metadata associated with the segment (e.g., received via communications network 414 from media content source 416 or media guidance data source 418). For example, control circuitry 304 may receive metadata transmitted along with a currently playing segment of media asset 506. Possible sources of metadata may include media guidance data source 418 (e.g., accessible via communications network 414) or vertical blanking interval data transmitted by media content source 416. By analyzing the metadata, control circuitry 304 may determine content categories associated with the currently presented segment of media asset 506. For example, in response to user 504 changing the channel, control circuitry 304 may receive metadata associated with the new channel, and control circuitry 304 may then determine content categories associated with the segment of media currently being presented on the new channel. Depending on the type of metadata received by control circuitry 304, in some embodiments the metadata received by control circuitry 304 may also indicate content categories associated with future segments of media asset 506. For example, control circuitry 304 may request and receive metadata from a database (e.g., media guidance data source 418 via communications network 414) that stores metadata associated with different playback locations of the media asset. Systems and methods for retrieving metadata based on a playback location of the media asset are described in greater detail in Yates, U.S. Pat. No. 8,620,769, issued Dec. 31, 2013, which is hereby incorporated by reference herein in its entirety.

In some embodiments, control circuitry 304 may determine content categories by analyzing a database (e.g., media content source 416 or media guidance data source 418 via communications network 414) of user generated descriptions associated with a segment. For example, media guidance data source 418 may provide a data feed that includes messages sent by a plurality of users related to media asset 506, or sent during a prior broadcast of media asset 506. The messages in the data feed may have been posted by the users onto a social network, a blog, a news feed or any other medium in which multiple users may provide messages. In some implementations, the messages may be associated with particular segments of a media asset 506, or control circuitry 304 may determine a segment of a media asset 506 the messages are associated with. For example, control circuitry 304 may determine that a message posted by a user watching a particular channel at 6:05:21 pm on Jan. 10, 2014 is associated with the segment of the media asset that was being presented on that channel at 6:05:21 pm on Jan. 10, 2014. Control circuitry 304 may then identify keywords from frequently occurring words used in the messages. For example, control circuitry 304 may determine messages from users watching a particular segment of a new television show frequently contain the words "sexy" "filthy" "OMG" "make out" and "lick." Control circuitry 304 may then use those keywords to search a database (e.g., media content source 416 or media guidance data source 418 via communications network 414) of content categories frequently associated with particular keywords to identify possible content categories such as "Sexual Content" or "TV-MA." Identifying content contained in different segments of a media asset based on social media and/or information aggregated from multiple users is discussed in greater detail in Arme et al. U.S. Patent Application Publication No. 2013/0294755 A1, filed May 3, 2012, which is hereby incorporated by reference herein in its entirety.

In some embodiments, control circuitry 304 may identify content within a segment of media asset 506 by analyzing the segment using object recognition and audio recognition techniques, and determine content categories based on the identified content. Control circuitry 304 may use object recognition techniques such as edge detection, pattern recognition, including, but not limited to, self-learning systems (e.g., neural networks), optical character recognition, online character recognition (including, but not limited to, dynamic character recognition, real-time character recognition, intelligent character recognition), and/or any other suitable technique or method to determine objects in a portion of media asset 506 currently presented to user 504. In some embodiments, control circuitry 304 may utilize speech recognition techniques, including, but not limited to, Hidden Markov Models, dynamic time warping, and/or neural networks (as described above) to translate spoken words into text and/or process audio data to identify content or dialogue within media asset 506.

Control circuitry 304 may then use content identified by object recognition and audio recognition techniques to determine content categories associated with the media asset. For example, control circuitry 304 may analyze a scene from media asset 506 and identify several guns, shell casings, horses and blood spatter, along with multiple gun-fire sound effects. Control circuitry 304 may then cross-reference an external database (e.g., media guidance data source 418 via communications network 414), to determine content categories frequently associated with the identified objects. For example, control circuitry 304 may cross-reference the database and determine that the objects are often associated content categories such as "violence," "TV-MA," "Shoot out," and "Western."

In some embodiments, control circuitry 304 may determine the content contained within a segment in response to user input. For example, control circuitry 304 may receive input from user 504 (e.g., via user input interface 310) indicating that the segment currently displayed on media asset 506 contains "Graphic Violence." Control circuitry 304 may then determine the start and end time of the segment, and associate the "Graphic Violence" label with the segment. In some embodiments control circuitry 304 may prompt user 504 for the start time and end time of the segment. Control circuitry 304 may also determine the start time of the segment by determining when the user input indicating the content category was made. For example, control circuitry 304 may receive a user input at 00:34:21 indicating that the currently displayed segment contains "Graphic Violence," control circuitry 304 may then determine that the segment containing graphic violence starts at approximately 00:34:21.

In some embodiments, control circuitry 304 may determine the start time of a segment by analyzing user behavior. For example, control circuitry 304 may determine the time when user 504 first recognized a certain type of content by analyzing the user input history, imaging the user (e.g., via camera 508), or by analyzing input from a microphone. For example, control circuitry 304 may store a short segment of video or audio (e.g., taken from camera 508) recorded from user 504 in a buffer (e.g., on storage 308) along with a time-stamp of when the video and audio was recorded. In response to receiving an input (e.g., via user input interface 310) that the current segment contains "Graphic Violence," control circuitry 304 may then analyze the video and audio stored on the buffer to determine when user 504 first recognized the content with "Graphic Violence." For example, control circuitry 304 may determine that user 504 made an audible scream and made a sharp jumping motion at 00:34:14, and in response control circuitry 304 may determine that the segment containing "Graphic Violence" begins at 00:34:14.

In some embodiments, control circuitry 304 may determine the boundaries of a segment by analyzing the media asset. For example, control circuitry 304 may receive input from user 504 (e.g., via user input interface 310) indicating that the segment currently displayed on media asset 506 contains adult content. Control circuitry 304 may then use object recognition and/or audio recognition techniques (as described above) to identify when a segment begins or ends. For example, control circuitry 304 may determine the start and end time of a segment by determining when a character enters or exits a scene, or when music in media asset 506 changes.

Control circuitry 304 may determine, based on a characteristic associated with a user 504, that a segment of the media asset 506 is to be prevented from being generated for display to user 504. Control circuitry 304 may cross-reference a database (e.g., media content source 416 or media guidance data source 418 via communications network 414) to identify characteristics associated with user 504 such as a user profile associated with user 504. Other characteristics may include the age of user 504, or other identifiers such as their name and birthday. Other possible characteristics include height, facial features, body proportions, voice, gender, ethnicity, demographic information, content preferences, or past user behavior. Control circuitry 304 may then analyze the content categories associated with a segment of media asset 506 and the characteristics of user 504 to determine if the segment of media should not be generated for display to user 504. For example, control circuitry 304 may determine that a segment of media associated with the content category "TV-MA" should not be generated for display if user 504 is younger than eighteen years old.

In some embodiments, control circuitry 304 may determine characteristics of user 504 by imaging user 504 or recording audio of user 504 (e.g., via camera 508 attached to user device 502). Control circuitry 304 may then estimate characteristics such as the height, facial features, vocal pitch, or body proportions of user 504. Control circuitry 304 may then use those characteristics to determine other characteristics. For example, control circuitry 304 may use the facial features of user 504 or generate a voice-print of user 504 to determine a user identity and obtain a user profile, or control circuitry 304 may use the body proportions of user 504 or the pitch the user's voice to estimate the age of user 504. Control circuitry 304 may also use video and audio of user 504 to determine the user's current behavior, or to determine the user's current mood or interests. For example, if control circuitry 304 analyzes audio of user 504 and detects laughter, control circuitry 304 may determine user 504 is happy or amused. Similarly if control circuitry 304 analyzes the body language of user 504, and determines that user 504 is reclining and that the user's eyes are closed, control circuitry 304 may determine that user 504 is sleepy and attempting to nap.

In some embodiments, control circuitry 304 may determine that a segment of media asset 506 is to be prevented from being generated for display based on a user profile. Control circuitry 304 may determine content categories that are to be prevented from being generated for display to user 504 based on a user profile associated with user 504. For example, if control circuitry 304 accesses a user profile that indicates user 504 is sixteen years old and prefers not to see blood, control circuitry 304 may generate a blacklist of content categories that should not be generated for display to user 504. Control circuitry 304 may include "Rated R," and "TV MA," on the blacklist based on the determined age of user 504, and control circuitry 304 may also include "Blood," and "Graphic Violence" on the blacklist based on the determined user preferences. Control circuitry 304 may then monitor metadata associated with media asset 506 for content categories associated with each segment of media asset 506. For each segment of the media asset, control circuitry 304 may then compare the content categories associated with the segment with the blacklist of content categories to determine if the segment should be prevented from being generated for display.

Control circuitry 304 may then determine a context in which user 504 is viewing media asset 506. Control circuitry 304 may determine a context based on a geographic location, a date and time, a type of device 502 on which media asset 506 is generated for display, an arrangement of objects within a space, a user profile associated with the user, the user profile of a second user in the same room or the proximity of a second user to the user. For example, control circuitry 304 may determine a geographic location of user 504 by accessing GPS information on user equipment device 502, or GPS information available through communications network 414. In some embodiments control circuitry 304 may determine context by imaging the user or the environment around the user (e.g., via camera 508 located on user device 502). For example, control circuitry 304 may use camera 508 to obtain an image of the room, and then, using facial recognition and object recognition techniques, determine the number of users in the room and obtain user profiles for the users in the room. Control circuitry 304 may also assign a probability to certain types of context. For example, control circuitry 304 may identify several people in a room walking around, music playing in the background, and several types of alcohol and food placed on a table. Control circuitry 304 may then use those factors as part of a logistic regression, or another type of suitable statistical method, to assign a high probability to a "party" being part of the context.

In some embodiments, control circuitry 304 may identify a user environment surrounding the user as part of the context. For example, control circuitry 304 may use GPS information to determine if user 504 is at his or her home, or at the home of a friend. In addition to GPS information, control circuitry 304 may use imaging (e.g., via camera 508 located on user device 502) to identify the user environment. For example, control circuitry 304 may image the environment; identify a table, several chairs, a refrigerator, microwave, and stovetop; and determine that the user environment is a kitchen.

Control circuitry 304 may then identify replacement content for the segment based on the context. Control circuitry 304 may access different types of available replacement content stored on a local database (e.g., on storage 308) or from external databases (e.g., media content source 416 or media guidance data source 418 accessible through communications network 414). Databases containing replacement content may be hosted by media content providers, advertisers, or third party providers hosting user made content. Replacement content stored in the database may be associated with different types of context that the replacement content may be appropriate for. Examples of replacement content accessible to control circuitry 304 may include an application, a broadcast channel, a simulated phone call, a simulated news broadcast containing mixtures of real news and targeted advertisements, a social media update, a website, methods of blurring, methods for obscuring content using pictures or logos, and other media that is normally accessible by device 502 that control circuitry 304 is using to display media asset 506. For example, control circuitry 304 may determine a context including "multiple users," "early evening," "large format display," and "party." Control circuitry 304 may then cross-reference a database (e.g., media content source 416 or media guidance data source 418 accessible through communications network 414) to find replacement content appropriate for "multiple users," in the "early evening," at a "party" to be presented on a "large format display," and identify a plot summary of the media asset. Control circuitry 304 may also assign varying levels of importance to the different parts of the context when identifying replacement content.

In some embodiments, control circuitry 304 may identify the type of device 502 or applications installed on device 502, and identify appropriate replacement content. For example, control circuitry 304 may determine that device 502 is a mobile phone or small tablet computer with internet access capabilities and the ability to receive phone calls (e.g., an "iPhone" brand smart-phone made by the Apple computer company), and that the device currently has a number of social media applications installed (e.g., "Twitter" and "Facebook" applications capable of aggregating and displaying user-generated content available publically.) Control circuitry 304 may then cross-reference a database (e.g., media content source 416 or media guidance data source 418 via communications network 414) listing types of appropriate replacement content for a "mobile phone or small tablet computer," "able to receive calls," with "social media applications installed," and identify a number of social media updates to be presented in a fashion that approximates the appearance of the applications already installed on the device, or a simulated phone call that approximates the appearance of a phone call that would be received by device 502. Control circuitry 304 may select the type of replacement content based on user preferences or a record of past user interactions. For example, if control circuitry 304 determines that one social media application is opened more frequently than the others on device 502, control circuitry 304 may select replacement content that approximates the look of the more popular social media application. For example, if control circuitry 304 determines that the "Twitter" application is the most frequently used program for receiving social media on device 502, control circuitry 304 may select replacement content that approximates the look of the "Twitter" application, and control circuitry 304 may configure the replacement content to include a mix of advertisements, popular social media updates, content taken from social media applications installed on device 502, and content taken from the user's actual social media accounts (e.g., content normally available from the "Twitter" application installed on device 502, or content taken from the user's "Twitter" and "Facebook" accounts available on the Internet.)

In some embodiments control circuitry 304 may also identify replacement content that contains social media updates related to media asset 506. For example, if media asset 506 is a new episode of the show "Game of Thrones,"

control circuitry 304 may identify recent social media updates from users or user generated content related to the new episode of the show "Game of Thrones" (e.g., by users "live-blogging" or "live-tweeting," by submitting online blog posts or social media updates related to a new show as the new show is broadcast.) Control circuitry 304 may then present the recent social media updates along with advertisements, reviews of the new episode of the show "Game of Thrones," commentary from the cast and crewmembers involved in the new episode of the show "Game of Thrones," or other types of replacement content such as a plot summary of either the new episode of the show "Game of Thrones," or a summary of the last season of the show "Game of Thrones."

In some embodiments, control circuitry 304 may be configured to generate generic default replacement content. For example, if control circuitry 304 is unable to identify appropriate replacement content from the database, by default control circuitry 304 may be configured to blur or censor an image, bleep out audio, or generate for display only subtitles on top of a blurred or censored image.

In some embodiments, control circuitry 304 may present an advertisement with the replacement content. For example, control circuitry 304 may identify replacement content containing a plot summary of a film or movie along with a space for a customizable logo or advertisement. Control circuitry 304 may then select a logo or advertisement to be included with the replacement content. For example, control circuitry 304 may identify an empty bag of chips next to user 504 (e.g., via camera 508) as part of context. Control circuitry 304 may then cross-reference a database (e.g., media content source 416 or media guidance data source 418 accessible through communications network 414) for advertisements or logos associated with "chips," and control circuitry 304 may identify a logo for "Doritos" brand corn chips. Control circuitry 304 may then present the replacement content along with the advertisement for "Doritos" brand corn chips. In an alternate example, if control circuitry 304 identifies replacement content containing social media updates, control circuitry 304 may include a targeted advertisement along with the social media updates.

Control circuitry 304 may then replace the segment of media asset 506 with the identified replacement content. Control circuitry 304 may either stop displaying media asset 506 for the duration of the replacement content, or control circuitry 304 may generate for display the replacement content over media asset 506 and cover only a portion of media asset 506 containing imagery that should not be displayed. For example, if media asset 506 contains a violent act in only the top-right corner of a screen, control circuitry 304 may generate display replacement content in only the top-right corner of the screen.

In some embodiments, control circuitry 304 may generate for display replacement content based on a determined start time and duration of the segment. For example, control circuitry 304 may determine the start time and duration of the next segment of media asset 506 to be blocked by searching a database (e.g., media guidance data source 418 accessible via communications network 414) containing information about the different segments contained within the media asset. Each segment in the database may be listed with a start time, an end time, and any number of content categories that are associated with the segment. For example, if control circuitry 304 determines that "TV-MA" content should not be displayed and that the current playback location of the media asset is 00:23:42, control circuitry 304 may cross-reference the database to identify segments with a start time after 00:23:24 associated with the "TV-MA" content category, and then select the identified segment with the earliest start time. Control circuitry 304 may then start generating for display replacement content on device 502 at the start time of the next segment to be blocked, and continue displaying the replacement content for the duration of the segment. Control circuitry 304 may then generate for display the media asset after the replacement content has ended.

For example, control circuitry 304 may determine that the next segment of media asset 506 to be replaced beings at 00:24:32 and lasts for 35 seconds. Control circuitry 304 may then begin generating for display the replacement content at 00:24:32, and control circuitry 304 may continue to display the replacement content for 35 seconds. After the replacement content has ended, control circuitry 304 may resume playback of media asset 506 by generating for display media asset 506 on device 502.

In some embodiments, control circuitry 304 may determine that the next segment to be blocked overlaps with other segments to be blocked, and may extend the duration of the replacement content in response. For example, control circuitry 304 may treat the overlapping segments as a single segment with the start time of the earliest segment and the end time of the segment that ends last for the purposes of determining a duration of the replacement content. For example, if one segment containing "Graphic Violence" that should be blocked lasts between 00:02:01 and 00:02:25, and another segment containing "Nudity" that should be blocked lasts between 00:02:20 and 00:03:41, control circuitry 304 may start generating for display replacement content at 00:02:01, and continue displaying the replacement content until 00:03:41.

In some embodiments, control circuitry 304 may generate replacement content for a duration longer than the segment to be blocked, and present a selectable option to stop generating for display the replacement content after the duration of the segment. For example, control circuitry 104 may identify replacement content with a 30-second duration to block a segment of media asset 506 lasting between 00:32:00 and 00:32:17. Control circuitry 104 may begin generating for display the replacement content at 00:32:00. At 00:32:17 control circuitry 104 may generate for display a selectable option for user 504 to stop the presentation of the replacement content and resume playback of media asset 506. In response to receiving a selection of the option, control circuitry 304 may stop presenting the replacement content and generate for display media asset 506.

In some embodiments, control circuitry 304 may generate for display replacement content for longer than the duration of the segment, but resume generating for display media asset 506 at the time when the segment ends. For example, if a segment starts at 00:34:00 and lasts 26 seconds, control circuitry 304 may identify replacement content that includes a simulated news broadcast with an integrated advertisement that lasts for 30 seconds. After generating for display the replacement content for 30 seconds, control circuitry 304 may resume playback of the media asset at the 00:34:26 mark rather than the 00:34:30 mark. If media asset 506 is a stream, DVD, or other pre-recorded media with an easily altered playback location, control circuitry 304 may transmit an instruction to begin playback at the 00:34:26 mark (e.g., by transmitting an instruction directly to media content source 416 via communications network 414). For other types of media, control circuitry 304 may record media asset 506 in a buffer while the replacement content is being generated for display. For example, if media asset 506 is a live broadcast of a show on television, control circuitry 304 will begin generating for display the replacement content at the 00:34:00 mark and begin recording the media asset to a buffer at least 4 seconds long (e.g., on storage 308.) After generating for display the replacement content for 30 seconds, control circuitry 304 may resume generating for display media asset 506 at the 00:34:26 mark using the information stored on the buffer.

In some embodiments, control circuitry 304 may allow user 504 to override the replacement content. While generating for display the replacement content, control circuitry 304 may provide an option for a user to override the replacement content and resume generating for display media asset 506. For example, control circuitry 304 may generate for display a small message along with the replacement content indicating that the replacement content may be removed, or control circuitry 304 may wait for a user input (e.g., via user input interface 310) indicating that user 504 wishes to remove the replacement content. Control circuitry 304 may receive user input in any form, for example, control circuitry 304 may receive a request made from a key-press on a remote control, or control circuitry 304 may monitor the user 504 using camera 508 on device 502 for a gesture or motion indicating a desire to override the replacement content. In response to receiving the selection of the override option during the presentation of the replacement content, control circuitry 304 may prompt the user to input a credential. For example, control circuitry 304 may prompt user 504 for a credential in the form of a password or PIN number to be entered (e.g., via user input interface 310).

In some embodiments, control circuitry 304 may also verify the identity of user 504 by imaging the user using camera 508 and comparing the identified user to a list of users with override access. For example, if a household has both adults and children, the adults may be given override access while the children may not. As an alternate example, if device 502 is mounted to the wall of a restaurant or bar, only the owner and managers of the establishment may be given override access. If control circuitry 304 determines that the received credential is valid, control circuitry 304 will suspend the replacement content and resume generating for display the segment of media instead. For example, if control circuitry 304 began presenting replacement content at the 01:20:10 mark, and 5 seconds elapsed before a valid credential was received, control circuitry 304 may resume generating for display media asset 506 at the 1:20:15 mark.

In some embodiments, control circuitry 304 may resume generating for display the media asset at the beginning of the segment. For example, even if 5 seconds elapsed between control circuitry 304 beginning to generate for display the replacement content and control circuitry 304 receiving a valid credential, control circuitry 304 may resume playback of media asset 506 at the 1:20:10 mark, when the segment began. Control circuitry 304 may achieve this by either transmitting an instruction to resume playback of media asset 506 at the 1:20:10 mark, or by recording media asset 506 to a buffer while the replacement content plays, and resuming playback from the beginning of the buffer.

In some embodiments, control circuitry 304 may determine a level of attentiveness of user 504. Control circuitry 304 may determine a level of attentiveness by monitoring the number and frequency of user interactions (e.g., monitoring use of user input interface 310) or by analyzing audio and images of user 504 via sensors accessible to control circuitry 304 (e.g., via camera 508 located on user device 502). For example, by imaging the user, control circuitry 304 may track the eyes of user 504 to determine if user 504 is looking at media asset 506 attentively. As an alternate example, control circuitry 304 may determine that a user has a low level of attentiveness if control circuitry 304 receives a user input to mute media asset 506, or if control circuitry 304 receives a series of user inputs to change channels in quick succession. As part of determining user attentiveness, control circuitry 304 may also determine if the user 504 is discussing media asset 506. For example, control circuitry 304 may use microphones in conjunction with audio and speech recognition techniques (as described above) to identify words user 504 is saying, and cross-reference the identified words with a database (e.g., media content source 416 via communications network 414) listing words and phrases associated with media asset 506.

In some embodiments, control circuitry 304 may then identify replacement content based on the level of attentiveness of user 504. For example, control circuitry 304 may identify replacement content containing an advertisement if the level of attentiveness exceeds a threshold level, or control circuitry 304 may identify replacement content that is unobtrusive or only covers a portion of media asset 506. If control circuitry 304 determines a low level of attentiveness, control circuitry 304 may generate for display replacement content without a targeted advertisement, or control circuitry 304 may provide plot summaries or highlights from media asset 506 instead.

FIG. 6 is a flowchart of illustrative steps involved in blocking sections of media content, in accordance with some embodiments of the disclosure. It should be noted that process 600 or any step thereof could be performed on, or provided by, any of the devices shown in FIGS. 3-5. For example, process 600 may be executed by control circuitry 304 (FIG. 3) as instructed by control circuitry implemented on user equipment 402, 404, and/or 406 (FIG. 4) to identify replacement content. In addition, one or more steps of process 600 may be incorporated into or combined with one or more steps of any other process or embodiment.

At 602, control circuitry (e.g., control circuitry 304 (FIG. 3)) may generate for display a media asset (e.g., media asset 506 displayed on user device 502 (FIG. 5)). For example, control circuitry 304 may first retrieve media asset 506 stored locally on a machine-readable medium (e.g., on storage 308 (FIG. 3)) or receive media asset 506 as broadcast by a media content provider (e.g., from media content source 416 via communications network 414 (FIG. 4)), or receive media asset 506 as streamed or transmitted from a website or over-the-top provider (e.g., via communications network 414 (FIG. 4)). Control circuitry 602 may then adapt media asset 506 to be generated for display with an appropriate resolution and aspect ratio.

At 604, control circuitry 304 may determine, based on a characteristic associated with a user (e.g., user 504 (FIG. 5)), that a segment of the media asset is to be prevented from being generated for display to the user. Examples of characteristics associated with the user may include information determined from a user profile, such as the user's name or age. Other examples may include a user's height, facial features, body proportions, voice, user identification, gender, ethnicity, demographic information, past user behavior, content preferences, and the like. For example, control circuitry 304 may determine characteristics such as the age of user 504. Control circuitry 304 may then receive metadata (e.g., from media content source 416 via communications network 414) associated with a segment of media indicating content categories that the segment is associated with. For example, control circuitry 304 may determine that segments of media flagged as "TV-MA" or "Graphic Violence" should not be generated for display to a user under a certain age.

In some embodiments, control circuitry 304 may determine a set of content categories that are to be prevented from being generated for display to the user from a profile associated with the user (e.g., user 504 (FIG. 5)). For example, control circuitry 304 may access a user profile associated with user 504 stored locally (e.g., on storage 308 (FIG. 3)) or remotely (e.g., on media guidance data source 418 via communications network 414) and determine that user 504 is sixteen years old. Control circuitry 304 may also obtain content preferences from the user profile, and determine that user 504 dislikes coarse language, but is comfortable with graphic violence. Control circuitry 304 may then determine a set of content categories or media types that should not be generated for display to the user. For example, based on the user preferences and user age control circuitry 304 may determine that content categories including "TV-MA," "Rated R" or "Strong Language" should be prevented from being generated for display. Control circuitry 304 may then monitor metadata associated with the media asset (e.g., metadata transmitted by media content source 416 via communications network 414 (FIG. 4)), wherein the metadata comprise an indication of content categories associated with each segment of the media asset. For example, control circuitry 304 may receive metadata indicating that the media asset may be broken into several overlapping segments. As described above and below, control circuitry 304 may determine the start and end times of each segment within media asset 506 from the metadata associated with media asset 506, along with content categories associated with each segment. Control circuitry 304 may then determine if the segment should be prevented from being generated for display by cross-referencing the content categories associated with the segment with the content categories that should not be generated for display. For example, if control circuitry 304 determined that "Blood" and "Guts" should not be generated for display, and that the segment is associated with "Guns," "Horses," "TV-MA," and "Blood," control circuitry 304 may determine that the segment should not be generated for display.

In some embodiments, control circuitry 304 may determine categories that should not be generated for display based on past user behavior. For example, if a user (e.g., user 504 (FIG. 5)) manually blocks or unblocks certain segments of media, control circuitry 304 may keep a record of this behavior (e.g., on storage 308). Control circuitry 304 may periodically analyze content categories shared by blocked or unblocked segments to determine new categories that should be blocked or unblocked. Control circuitry 304 may store this information as part of a user profile associated with user 504. Changes to the user profile may also be presented by control circuitry 304 to the user 504 for confirmation. For example, control circuitry 304 may determine that user 504 will frequently unblock segments of media containing "graphic violence," but user 504 will never unblock segments of media containing "dismemberment." Control circuitry 304 may update the profile of user 504 to allow "graphic violence" to be generated for display but to restrict "dismemberment." Control circuitry 304 may also update an external database (e.g., media guidance data source 418 via communications network 414 (FIG. 4)) listing content categories associated with different segments to indicate that a user request was made to manually block or unblock the segment, and to add or remove content categories associated with the segment.

In some embodiments, control circuitry 304 may image a body of a user in a field of view of a camera (e.g., image user 504 via camera 508 on user device 502). Control circuitry 304 may then identify facial features or body proportions from the imaged body. Control circuitry 304 may then determine characteristics associated with user 504 based on the identified facial features or body proportions. For example, control circuitry 304 may use facial recognition techniques to determine the identity of user 504 by cross-referencing a database (e.g., stored locally on storage 308) of known users. If control circuitry 304 determines the user identity, control circuitry 304 may access a user profile and determine user characteristics such as age and content preferences. Control circuitry 304 may also estimate user characteristics such as height, age, and demographic information from the body proportions. Control circuitry 304 may use this information to search a database of known users to identify the user, or, in the absence of a known user profile, control circuitry 304 may simply associate the estimated user characteristics to user 504. For example, control circuitry 304 may have user profiles stored locally (i.e., in storage 308) for "Jack," "Jill," "Grandpa," and "Little Timmy." Control circuitry 304 may image user 504, and determine a height between 4 feet and 5 feet tall and an age between 8 and 10 based on body proportions. Control circuitry 304 may cross-reference that information with locally stored user profiles to determine that the user is "Little Timmy." Control circuitry 304 may also determine that certain content categories, such as those unsuitable for children under the age of 18, are should be blocked based on the estimated age range alone.

At 606, control circuitry 304 may determine a context in which the user is viewing the media asset. For example, control circuitry 304 may use records of user behavior (e.g., inputs to user input interface 310 tracked by processing circuitry 306 and recorded on storage 308), or sensors such as cameras, microphones, accelerometers or GPS (e.g., camera 508 on device 502 (FIG. 5)), in order to determine the context. The context may include information such as a geographic location, a date and time, a type of a device on which the media asset is generated for display, an arrangement of objects within the user environment, a user profile associated with the user, a proximity of a second user to the user, or a user profile associated with the second user. For example, control circuitry 304 may access camera 508 to perform object recognition to identify three users in a room, one small child and two adults. Control circuitry 304 may also determine that the time is 7:00 pm on Monday. Control circuitry 304 may then identify a context that includes "three users" "one child age (5-7)" "possible family" "weekday night."

At 608, control circuitry 304 may identify replacement content for the segment based on the context. The replacement content may be an application, a broadcast channel, a simulated phone call, a simulated news broadcast, a social media update, a website, and other media that is normally accessible by a type of a device on which the media asset is generated for display. For example, Control circuitry 304 may cross-reference a database (e.g., media content source 416 via communications network 414 (FIG. 4)) for replacement content appropriate for "three users" "one child age (5-7)" "possible family" "weekday night," capable of replacing a segment at least 20 seconds long, and identify a simulated news broadcast which may be adapted to contain educational information for the child and a targeted advertisement for the other users. For example, the replacement content identified by control circuitry 304 may contain "breaking news" informing the users that "a regular bedtime and at least 9 hours of sleep are important for all children," along with a logo or video in the corner advertising household products. Control circuitry 304 may also include mixtures of real news into the simulated broadcast and the replacement content to accommodate the length of the segment.

In some embodiments, determining the context further comprises identifying a user environment surrounding the user, and identifying replacement content based on the environment. For example, control circuitry 304 may use camera 508 and GPS (e.g., located within wireless user communications device 406) to identify the user environment as the home of a friend. Control circuitry 304 may then identify replacement content based on the user environment. For example, control circuitry 304 may cross-reference a database (e.g., media content source 416 via communications network 414 (FIG. 4)) for replacement content appropriate for a context that includes "late night," "home of a friend," and "empty bottles," and identify a public service announcement warning about dangers of drinking and driving.

In some embodiments, control circuitry 304 may identify replacement content based on the level of attentiveness of user 504. For example, control circuitry 304 may determine a level of attentiveness by monitoring the number and frequency of user interactions (e.g., monitoring use of user input interface 310) or by imaging user 504 via sensors accessible to control circuitry 304 (e.g., via camera 508 located on user device 502). Control circuitry 304 may then identify replacement content based on the level of attentiveness of user 504. For example, control circuitry 304 may identify replacement content for a segment of a movie that may be adapted to include a logo or advertisement in a portion of the screen. If the level of user attentiveness is above a threshold level, control circuitry 304 may include a paid advertisement as part of the replacement content. If the level of user attentiveness is not above a threshold level, control circuitry 304 may include a summary of the movie plot instead.

At 610, control circuitry 304 may replace the segment with the identified replacement content. Control circuitry 304 may present the replacement content in place of the media asset (e.g., replacement content filling the full screen of device 502 that previously was displaying media asset 506), or control circuitry 304 may generate for display the replacement content over a small portion of media asset 506 covering only certain imagery that should not be generated for display. For example, if control circuitry 304 determines that a segment of media asset 506 containing a nude body should not be generated for display, control circuitry 304 may generate for display replacement content that covers only the nude body. In some embodiments control circuitry 304 may determine how much of media asset 506 to block based on the context. For example, if control circuitry 304 identifies a context involving a young child home alone, watching a film on a smart-phone, control circuitry 304 may replace the entire media asset with the replacement content. As an alternate example, if control circuitry 304 identifies a context where an older adult is sitting close to the child, control circuitry 304 may censor only the figure of the nude body, allowing the adult to still see the rest of the content in the segment.

In some embodiments, control circuitry 304 may replace the segment by first determining a start time and duration for a segment of media that is to be blocked. For example, control circuitry 304 may determine that the segment begins 3 minutes into the media and has a duration of 12 seconds. Control circuitry 304 may cross-reference a database (e.g., media content source 416 via communications network 414) to identify replacement content that is at least 12 seconds long, or that can be adapted to be at least 12 seconds long. For example, control circuitry 304 may identify a social media update or plot summary that can be adapted to fill between 10-30 seconds by presenting the first or last frames as a static image for a variable duration of time. Control circuitry 304 may then begin generating for display the replacement content at the start time of the segment and present the replacement content for the duration of the segment. For example, control circuitry 304 may adapt a social media update to be presented in place of the segment and last for exactly 12 seconds. Control circuitry 304 may then resume playback of the media asset (e.g., media asset 506 (FIG. 5)) once the replacement content has ended.

In some embodiments, control circuitry 304 may allow a user to override the blocking. Control circuitry 304 may receive a user selection of an override option during the presentation of the replacement content. For example, control circuitry 304 may be presenting a fake news broadcast in place of a segment of media containing suggestive content, and receive a user input (e.g., via user input interface 310) requesting that control circuitry 304 suspend the replacement content and resume the media asset (e.g., media asset 506 (FIG. 5)). In response, control circuitry 304 may then prompt the user to input a credential. For example, control circuitry 304 may ask for a parental control PIN code. In response to receiving the a valid credential, control circuitry 304 may suspend the presentation of the replacement content and resume generation for display of the segment of media.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

Figure 7:
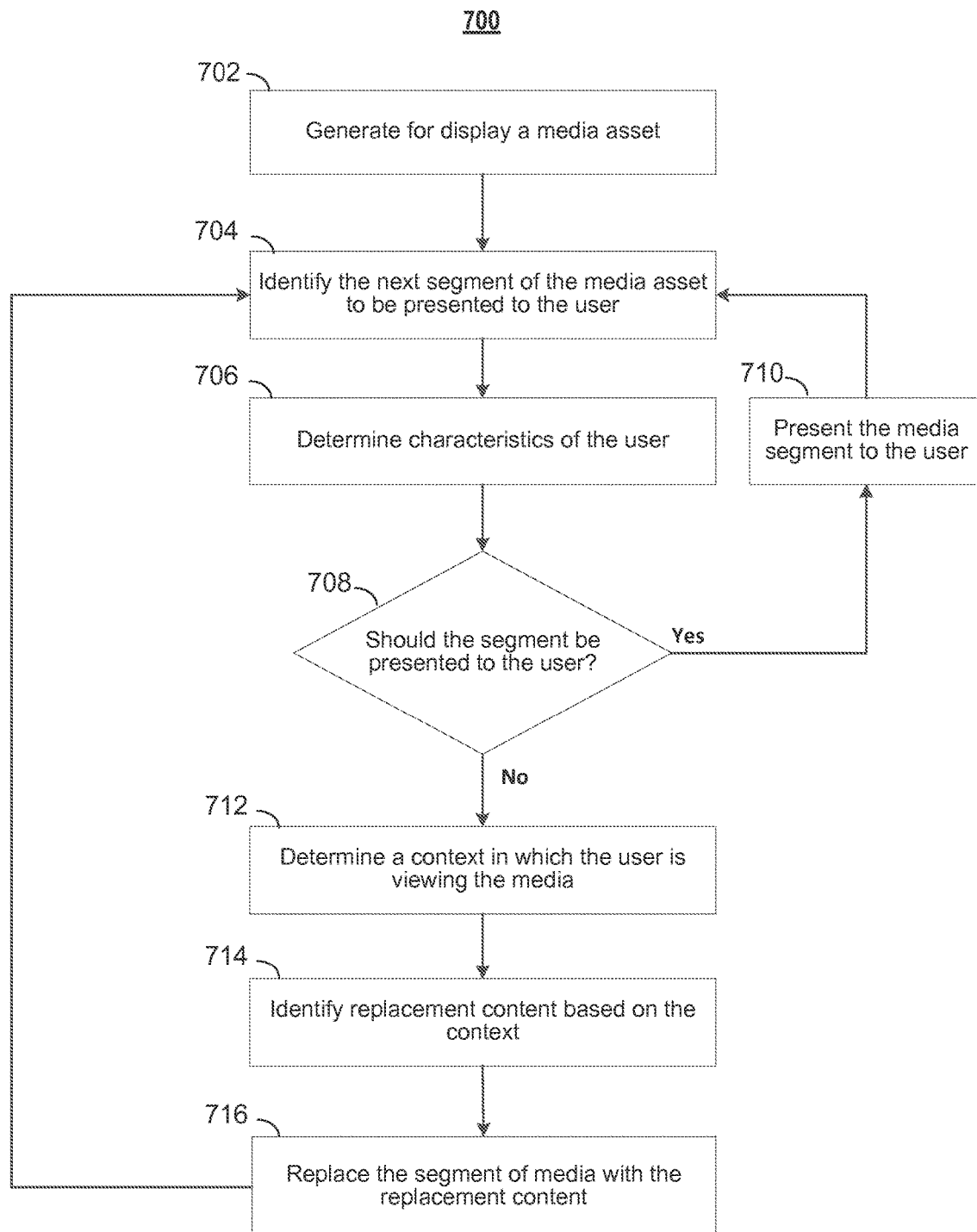
FIG. 7 is a flowchart of illustrative steps involved in determining whether a segment of media should be blocked, in accordance with some embodiments of the disclosure.

FIG. 7 is a flowchart of illustrative steps involved in determining whether a segment of media should be blocked. It should be noted that process 700 or any step thereof could be performed on, or provided by, any of the devices shown in FIGS. 3-5. For example, process 700 may be executed by control circuitry 304 (FIG. 3) as instructed by control circuitry implemented on user equipment 402, 404, and/or 406 (FIG. 4) to determine whether a segment of a media asset should be blocked. In addition, one or more steps of process 700 may be incorporated into or combined with one or more steps of any other process or embodiment (e.g., process 600 (FIG. 6)).

At 702, control circuitry 304 may generate for display a media asset (e.g., media asset 506 (FIG. 5)). For example, control circuitry 304 may be receiving an episode of the television show "Dexter" from a media content provider (e.g., from media content source 416 via communications network 414 (FIG. 4)), and generate for display the episode on a small wireless device (e.g., wireless user communications device 406 (FIG. 4)).

At 704, control circuitry 304 may identify the next segment of the media asset to be presented to the user. For example, control circuitry 304 may receive metadata from media content source 416 along with media asset 506, indicating the start and stop time of various segments of media along with content categories associated with the segments. For example, control circuitry 304 may receive metadata indicating that the segment from 00:00:05-00:00:35 has been flagged with the content category "blood," and the segment from 00:00:25-00:00:30 is associated with the category "partial nudity." Control circuitry 304 may identify the segment from 00:00:05-00:00:35 as the next segment to be generated for display since it has the earlier start time. If there are no more media segments, or the media asset has finished playing, process 700 will terminate.

At 706, control circuitry 304 may determine characteristics of the user (e.g., user 504 (FIG. 5)). For example, control circuitry 304 may access a locally stored user profile (e.g., from storage 308 (FIG. 3)), to determine a user age, name, and content preferences.

At 708, control circuitry 304 may determine whether the segment should be presented to user 504. For example, control circuitry 304 may determine from the user preferences that user 504 is indifferent to "blood," but should not be shown "partial nudity" due to the user's age. Depending on the determination made by control circuitry 304, the process may continue to 710 if the segment may be generated for display to user 504, or the process may continue to 712 if control circuitry 304 determines that the segment is not to be generated for display to the user. For example, control circuitry 304 may determine that the segment from 00:00:05-00:00:35 associated with the category "blood" may be generated for display to the user, and process 700 would proceed to 710. In an alternate example, if the next segment was the segment from 00:00:25-00:00:30 that is associated with the category "partial nudity," control circuitry 304 would determine that the segment should not be presented to the user and process 700 would proceed to 712.

At 710, control circuitry 304 may present the segment to the user. Process 700 will then proceed back to 704, where control circuitry 304 may identify the next segment to be presented. For example, after determining that the segment from 00:00:05-00:00:35 associated with the category "blood" may be generated for display, control circuitry 304 will identify the segment from 00:00:25-00:00:30 associated with "partial nudity" to be the next segment to be presented.

At 712, control circuitry 304 may determine a context in which the user is viewing the media. For example, control circuitry 304 may use GPS (e.g., from wireless user communications device 406 (FIG. 4)), the date and time (e.g., from user equipment 402, 404, or 406 accessible via communications network 414 (FIG. 4)), object detection based on images taken of user environment (e.g., via camera 508 on user device 502 (FIG. 5)) and analysis of conversation and sounds taken from the user environment to determine a context.

At 714, control circuitry 304 may identify replacement content based on the context. For example, control circuitry 304 may identify a context that included "2 users," "late night," and "silly user conversation." Control circuitry 304 may then cross-reference a database (e.g., media content source 416 via communications network 414) for replacement content appropriate for the context and suitable for replacing a segment starting at 00:00:25 and having a 5-second duration, and identify "smiley face censor bar" replacement content.

At 716, control circuitry 304 may replace the segment of media with the replacement content. For example, control circuitry 304 will generate for display smiley faces to obscure the partial nudity starting at 00:00:25 and lasting until 00:00:30. Process 700 will then proceed back to step 704 to identify the next media segment to be presented.

It is contemplated that the steps or descriptions of FIG. 7 may be used with any other embodiments of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 7.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, determining a segment of a media asset is to be prevented from being generated from display may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the content categories associated with segments of a media asset as described herein may be stored in, and retrieved from, storage 308 of FIG. 3, or media guidance data source 418 of FIG. 4. Furthermore, processing circuitry, or a computer program, may update settings associated with a user, such as user profile preferences, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for blocking sections of media from being presented to a user comprising:
   generating for display a media asset using user equipment;
   determining, based on a characteristic associated with a user, that a segment of the media asset is to be prevented from being generated for display to the user;

selecting, using control circuitry, a plurality of factors for determining a context in which the user is viewing the media asset, wherein each of the plurality of factors represents a state unrelated to the media asset that is external to the user equipment;

automatically retrieving first data associated with a first of the plurality of factors, wherein the first data identifies positions of a plurality of inanimate objects within a threshold proximity of the user equipment, wherein each of the plurality of inanimate objects is of a different type;

automatically retrieving second data associated with a second of the plurality of factors;

retrieving, from a database, based on a combination of the first data and the second data, replacement content for the segment; and replacing the segment with the identified replacement content.

2. The method of claim 1, wherein replacing the segment further comprises:
determining (1) a start time corresponding to a time when the segment is to be presented to the user, and (2) a duration of the segment;
generating for display, at the start time, the replacement content;
presenting the replacement content to the user for the duration; and
generating for display the media asset after the replacement content has ended.

3. The method of claim 1, wherein the replacement content comprises at least one of an application, a broadcast channel, a simulated phone call, a simulated news broadcast, a social media update, a website, and other media that is normally accessible by a type of a device on which the media asset is generated for display.

4. The method of claim 1, wherein determining the context further comprises identifying a user environment surrounding the user, and wherein the replacement content is based on the user environment surrounding the user.

5. The method of claim 1, wherein at least one of the plurality of factors comprises at least one of: a geographic location, a date and time, a type of a device on which the media asset is generated for display, a user profile associated with the user, a proximity of a second user to the user, and a user profile associated with the second user.

6. The method of claim 1, wherein the characteristic associated with the user comprises at least one of an age, name, height, facial features, body proportions, voice, user identification, gender, ethnicity, demographic information, past user behavior, user profile information and content preferences.

7. The method of claim 1 wherein determining that the segment of the media asset is to be prevented from being generated for display further comprises:
imaging a body of a user in a field of view of a camera;
identifying at least one of facial features and body proportions from the imaged body;
determining the characteristic associated with the user based on the at least one of the identified facial features and the body proportions; and
determining, based on the characteristic, that the segment is to be prevented from being generated for display to the user.

8. The method of claim 1 wherein determining that the segment of the media asset is to be prevented from being generated for display further comprises:

determining, based on a profile associated with the user, a set of content categories that are to be prevented from being generated for display to the user;
monitoring metadata associated with the media asset, wherein the metadata comprise an indication of content categories associated with each segment of the media asset; and
determining, based on the monitoring, that the segment is to be prevented from being generated for display to the user in response to detecting metadata associated with the segment that matches the set of content categories.

9. The method of claim 1, further comprising:
presenting the replacement content in place of the segment;
receiving a user selection of an override option during the presentation of the replacement content;
in response to receiving the selection of the override option, prompting the user to input a credential;
receiving input of the credential;
determining whether the credential is valid; and
in response to determining that the credential is valid, suspending the presentation of the replacement content, and resuming the generation for display of the segment of the media asset.

10. The method of claim 1, further comprising:
determining a level of attentiveness of the user;
determining whether the level of attentiveness exceeds a threshold level;
in response to determining that the level of attentiveness exceeds the threshold level:
identifying replacement content comprising an advertisement, and
replacing the segment of the media asset with the advertisement; and
in response to determining that the level of attentiveness does not exceed the threshold level:
identifying replacement content comprising non-advertising media, and
replacing the segment of the media asset with the non-advertising media.

11. A system for blocking section of media from being presented to a user comprising:
user input circuitry; and
control circuitry configured to:
generate for display a media asset using user equipment;
determine, based on a characteristic associated with a user, that a segment of the media asset is to be prevented from being generated for display to the user;
select a plurality of factors to determine a context in which the user is viewing the media asset, wherein each of the plurality of factors represents a state unrelated to the media asset that is external to the user equipment;
automatically retrieve first data associated with a first of the plurality of factors, wherein the first data identifies positions of a plurality of inanimate objects within a threshold proximity of the user equipment, wherein each of the plurality of inanimate objects is of a different type;
automatically retrieve second data associated with a second of the plurality of factors;
retrieve, from a database, based on a combination of the first data and the second data, replacement content for the segment; and replace the segment with the identified replacement content.

12. The system of claim 11, wherein the control circuitry is further configured, when replacing the segment, to:
   determine (1) a start time corresponding to a time when the segment is to be presented to the user, and (2) a duration of the segment;
   generate for display, at the start time, the replacement content;
   present the replacement content to the user for the duration; and
   generate for display the media asset after the replacement content has ended.

13. The system of claim 11, wherein the replacement content comprises at least one of an application, a broadcast channel, a simulated phone call, a simulated news broadcast, a social media update, a website, and other media that is normally accessible by a type of a device on which the media asset is generated for display.

14. The system of claim 11, wherein the control circuitry is further configured, when determining the context further, to identify a user environment surrounding the user, and wherein the control circuitry is further configured to identify replacement content based on the user environment surrounding the user.

15. The system of claim 11, wherein at least one of the plurality of factors comprises at least one of: a geographic location, a date and time, a type of a device on which the media asset is generated for display, a user profile associated with the user, a proximity of a second user to the user, and a user profile associated with the second user.

16. The system of claim 11, wherein the characteristic associated with the user comprises at least one of an age, name, height, facial features, body proportions, voice, user identification, gender, ethnicity, demographic information, past user behavior, user profile information and content preferences.

17. The system of claim 11, wherein the control circuitry is further configured, when determining that the segment of the media asset is to be prevented from being generated for display, to:
   image a body of a user in a field of view of a camera;
   identify at least one of facial features and body proportions from the imaged body;
   determine the characteristic associated with the user based on the at least one of the identified facial features and the body proportions; and
   determine, based on the characteristic, that the segment is to be prevented from being generated for display to the user.

18. The system of claim 11, wherein the control circuitry is further configured, when determining that the segment of the media asset is to be prevented from being generated for display, to:
   determine, based on a profile associated with the user, a set of content categories that are to be prevented from being generated for display to the user;
   monitor metadata associated with the media asset, wherein the metadata comprise an indication of content categories associated with each segment of the media asset; and
   determine, based on the monitoring, that the segment is to be prevented from being generated for display to the user in response to detecting metadata associated with the segment that matches the set of content categories.

19. The system of claim 11, wherein the control circuitry is further configured to:
   present the replacement content in place of the segment;
   receive a user selection of an override option during the presentation of the replacement content;
   in response to receiving the selection of the override option, prompt the user to input a credential;
   receive input of the credential;
   determine whether the credential is valid; and
   in response to determining that the credential is valid, suspend the presentation of the replacement content, and resume the generation for display of the segment of the media asset.

20. The system of claim 11, wherein the control circuitry is further configured to:
   determine a level of attentiveness of the user;
   determine whether the level of attentiveness exceeds a threshold level;
   in response to determining that the level of attentiveness exceeds the threshold level:
      identify replacement content comprising an advertisement, and
      replace the segment of the media asset with the advertisement; and
   in response to determining that the level of attentiveness does not exceed the threshold level:
      identify replacement content comprising non-advertising media, and
      replace the segment of the media asset with the non-advertising media.

* * * * *